United States Patent [19]
Scerbak

[11] Patent Number: 5,715,080
[45] Date of Patent: Feb. 3, 1998

[54] COMPACT UNIFORM FIELD FARADAY ISOLATOR

[76] Inventor: David G. Scerbak, 2028 E. Front St., Traverse City, Mich. 49684

[21] Appl. No.: 944,260

[22] Filed: Sep. 11, 1992

[51] Int. Cl.$^6$ .................... G02F 1/09; G02B 5/30
[52] U.S. Cl. .................. 359/281; 359/283; 359/484; 372/703
[58] Field of Search ................ 359/280, 281, 359/282, 283, 484; 372/703

[56] References Cited

U.S. PATENT DOCUMENTS

| | | |
|---|---|---|
| 3,602,575 | 8/1971 | Young . |
| 3,707,321 | 12/1972 | Jaecklin et al. ............ 359/282 |
| 3,860,325 | 1/1975 | Matsushita et al. . |
| 4,033,670 | 7/1977 | Tanton et al. . |
| 4,609,257 | 9/1986 | Shirasaki . |
| 4,804,256 | 2/1989 | Wilson . |
| 4,856,878 | 8/1989 | Wilson et al. . |
| 4,909,612 | 3/1990 | Scerbak . |
| 5,029,953 | 7/1991 | Dexter et al. ............ 359/484 |
| 5,087,984 | 2/1992 | Heiney et al. ............ 359/282 |
| 5,115,340 | 5/1992 | Tidwell ................ 359/484 |

FOREIGN PATENT DOCUMENTS

| | | | |
|---|---|---|---|
| 57-185014 | 11/1982 | Japan | 359/484 |
| 58-132722 | 8/1983 | Japan | 359/484 |
| 59-55410 | 3/1984 | Japan | 359/484 |
| 59-165020 | 9/1984 | Japan | 359/484 |
| 4-109202 | 4/1992 | Japan | 372/103 |

OTHER PUBLICATIONS

Shibukawa et al, "Compact Optical Isolator for Near-Infrared Radiation," *Electronics Letters*, 24 Nov. 1977, No. 24, vol. 13, pp. 721 to 722.
Gauthier, D.J. et al, "Simple, compact, high-performance permanent magnet Faraday isolator", Optics Letters, vol. 11, No. 10, Oct., 1986 pp. 623–625.

*Primary Examiner*—Ricky D. Shafer
*Attorney, Agent, or Firm*—Alex Rhodes

[57] ABSTRACT

A compact Faraday rotator and isolator featuring a uniform magnetic field for isolating a light source from light which is directed back towards the light source. The isolator comprises a Faraday rotator between two polarizers in a uniform magnetic field. The uniform magnetic field is generated by two pairs of polyhedral shape magnets on opposite sides of the isolator's optical axis. The optical axis passes through a block of Faraday rotator material. One pair of magnets is disposed above the optical axis and the other pair of magnets is disposed below the optical axis. Opposite poles of the magnets are adjacent to each other on the same side of the optical axis and like poles of the magnets face each other across the optical axis, the direction of magnetization of each magnet being generally normal to the optical axis. The magnets on each side of the optical axis abut each other in the lengthwise vertical mid-plane of the Faraday optic and diverge from the mid-plane toward the Faraday optic, preferably to at least the ends of the Faraday optic. The gap forming geometry of the magnets and pole pieces generate a uniform and intense magnetic field having predominant longitudinal components which are parallel to the path of a beam passing through the Faraday rotator.

24 Claims, 10 Drawing Sheets

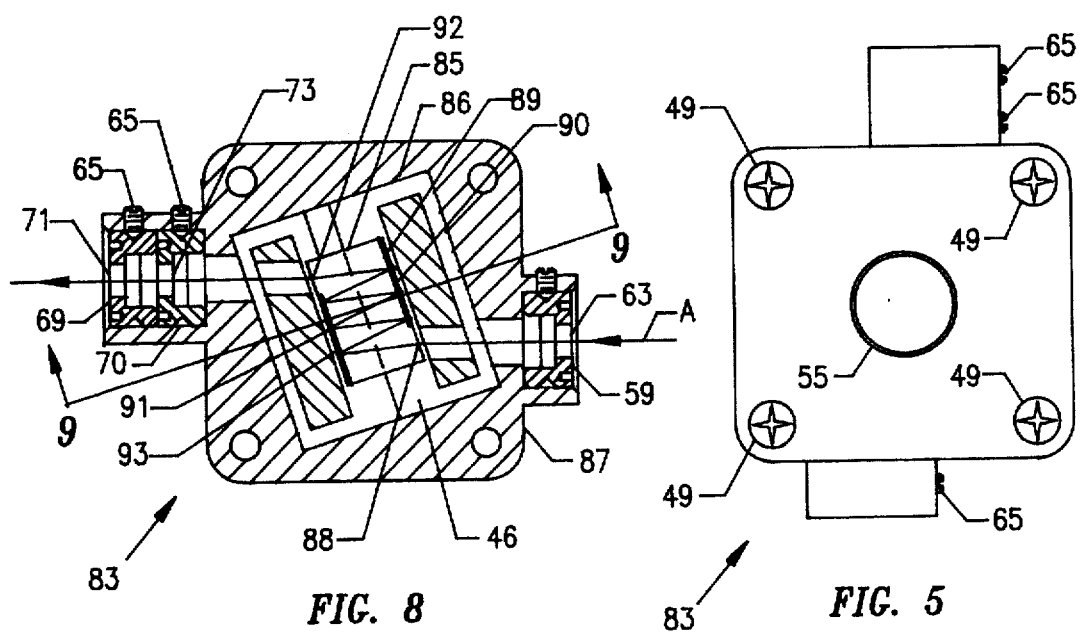
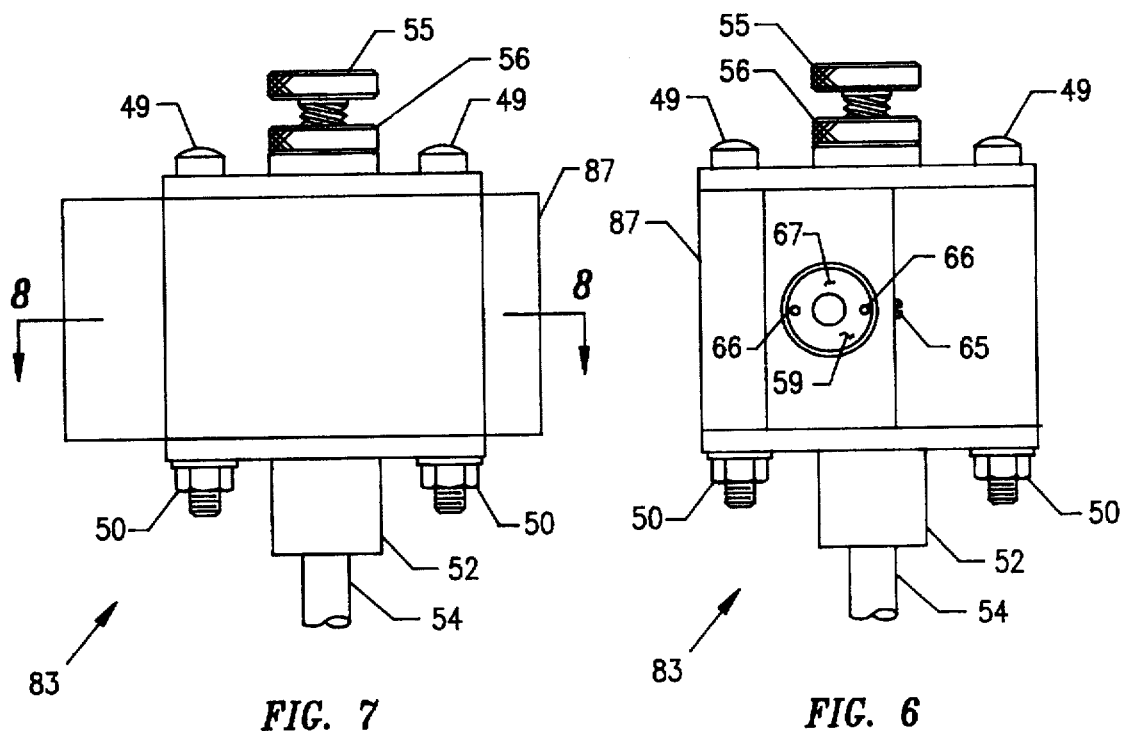

COMPACT UNIFORM FIELD FARADAY ISOLATOR

BACKGROUND OF THE INVENTION

This invention relates to Faraday rotators and optical isolators and more particularly to a Faraday rotator and optical isolator with a uniform intense magnetic field.

It is well known that backward propagating light rays into a laser source cause fluctuations in the frequency and intensity of the laser source. Such light is recognized as one of the major problems in laser experiments. The most effective way of isolating a laser source from backward propagating light is to position a Faraday isolator in the path of a beam.

A Faraday isolator consists of a Faraday rotator between an input and an output polarizer. The Faraday rotator includes an optical element in a longitudinal magnetic field. The optical element, often referred to as a Faraday optic or Faraday rotator material, generally consists of a rod or block of optically transparent glass having a high Verdet constant, by way of example, Hoya FR-5 glass. Under the influence of the magnetic field, the plane of polarization of a light beam is rotated when the beam passes through the Faraday optic. The amount of rotation is proportional to the Verdet constant, the length of the path of the beam in the Faraday optic and the intensity of the magnetic field.

When a beam passes through the isolator the beam is plane polarized in the input polarizer, the plane of polarization is rotated 45 degrees in the Faraday rotator and the beam exits through an output polarizer. When light is directed back toward the source, the light is plane polarized in the output polarizer, the plane of polarization is rotated an additional 45 degrees in the Faraday rotator, and the backward propagating light is blocked in the input polarizer. Thus isolation of the light source is achieved.

One problem with Faraday isolators is that non-uniformities in internal magnetic fields introduce non-uniform polarization rotation across laser beams passing through the isolators. Unless the laser beam diameter is made much smaller than Faraday optic cross-section, these non-uniformities limit isolation and degrade beam quality. Demanding commercial applications for large beam diameters require uniform polarization rotation as high as 98% over a beam aperture. Another problem is that Faraday isolators are big and bulky because of relatively weak magnetic fields. Large, bulky isolators are exemplified by Gauthier et al., Optics Letters, October 1986, Vol. 11 No. 10, wherein a long glass rod is surrounded by a magnetic field. Large bulky isolators prohibit their use when only small spaces are available.

With the foregoing in mind it will be appreciated that a compact Faraday isolator capable of meeting exacting commercial requirements would provide benefits heretofore unavailable.

SUMMARY OF THE INVENTION

The present invention is an improvement over U.S. Pat. No. 4,909,612 wherein pairs of flat magnets are serially disposed and on opposite sides of a block of Faraday rotator material to produce an intense magnetic field parallel to the direction of a laser beam passing through the Faraday rotator. It has been found that the geometry of the magnets in U.S. Pat. No. 4,909,612 is only useful for beam sizes which are small relative to the thickness of the Faraday optic. This is because the magnet geometry introduces non-uniform polarization rotation into laser beams which pass through the Faraday rotator. Test data has shown that the non-uniformities are substantial and are greater than 20 percent across the full Faraday optic aperture. Such large non-uniformities are inconsistent with demanding commercial applications which require uniformities as high as 98% over a beam aperture.

The present invention resides in a number of novel features which individually and collectively contribute to its ability to reduce non-uniformities in light beams, reduce isolator size, reduce isolator cost, and improve convenience.

In contrast to U.S. Pat. No. 4,909,612 wherein adjacent magnets of each pair of magnets abut each other, the present invention spaces apart the magnets of each pair about the mid-plane of the Faraday optic a distance which is preferably at least as long as the length of the Faraday optic along the optic axis. This spacing greatly improves the uniformity of the magnetic field over the prior art and is a necessary condition for achieving perfect uniformity across the full Faraday optic aperture. Inclining the magnet faces at the vertical mid-plane of the Faraday optic where adjacent magnets abut each other produces a field of high uniformity across the entire cross-section of the Faraday optic. Adding internal pole pieces adjacent to the ends of the Faraday optic further improves the uniformity of the magnetic field in the region of the Faraday optic.

An important benefit of the invention is that a uniform magnetic field is provided across the full Faraday optic aperture which eliminates non-uniformities in prior art isolators caused by non-uniform magnetic fields.

One feature of the invention is that the Faraday isolator can be tuned to adjust the rotation of a beam passing through the isolator. Another feature is that a heat sink is provided for dissipating heat in the Faraday isolator.

In the first aspect of the invention, the input aperture of the isolator is in the front of the isolator and the output aperture is in the rear of the isolator. Two embodiments for the first aspect are illustrated and described. In the first embodiment, a beam is plane polarized, the plane of polarization is rotated 45 degrees in a Faraday rotator, and the beam passes through an output polarizer.

In the second embodiment, the beam is reflected back and forth in a Faraday optic having an optically transparent input face portion, reflective coated opposite face portions and an optically transparent output face portion. The internal reflection of the beam results in a shorter Faraday optic and smaller isolator. For demanding commercial applications, a retarder, for example, a quarter wave plate is provided on the output side of the Faraday rotator to cancel out any polarization ellipticity introduced by the Faraday optic and reflective coating.

In the second aspect of the invention, the input aperture and output aperture of the isolator are in the front of the isolator. A beam enters through the input aperture, is reflected back and forth in the Faraday optic and exits the isolator through the output aperture in the front of the isolator.

The foregoing features and benefits, together with additional features and benefits will become more apparent from the ensuing description and drawings which describe the invention in detail. A preferred embodiment and the best mode contemplated by the inventor for practising his invention are disclosed in the detailed description. The subject matter in which exclusive property rights are claimed is set forth in each of the numbered claims which follow the detailed description of the preferred embodiment.

BRIEF DESCRIPTION OF THE DRAWINGS

FIG. 5 is a plan view of a second embodiment of the Faraday isolator.

FIG. 6 is a front elevational view of the Faraday isolator shown in FIG. 5.

FIG. 7 is a right side elevational view of the Faraday isolator shown in FIG. 5.

FIG. 8 is a cross-sectional view through the Faraday isolator taken on the line 8—8 in FIG. 7.

DETAILED DESCRIPTION OF THE PREFERRED EMBODIMENT

Figure 4:
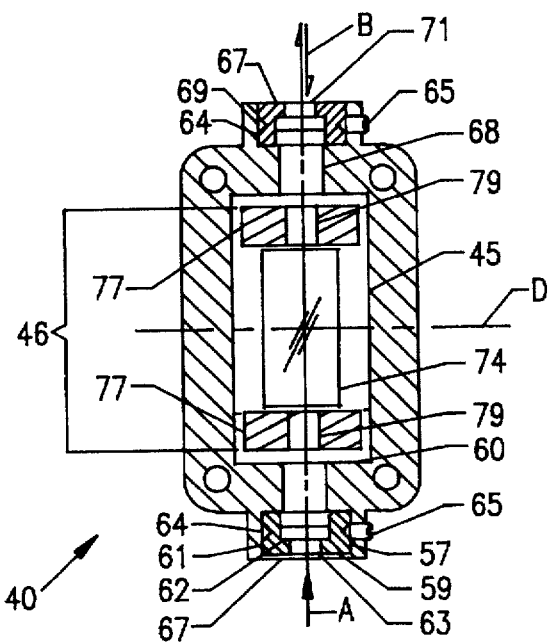
FIG. 4 is a cross-sectional view of the Faraday isolator taken on the line 4—4 in FIG. 2.
Figure 1:
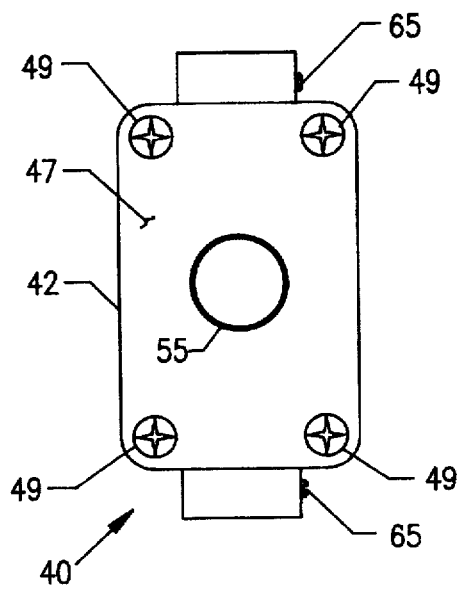
FIG. 1 is a plan view of a compact Faraday isolator which embodies the principles of the present invention.

Referring now to the drawings wherein like numerals designate like and corresponding parts throughout the several views, a compact optical isolator, generally designated by the numeral 40, is shown in FIGS. 1 through 4, inclusive, which embodies the principles of the present invention. The isolator 40 is a generally rectangular assembly which is mounted on a stand 41. The isolator 40 is placed in the path of a laser beam "A" to isolate the source (not shown) of the laser beam "A" from light "B" which is directed back towards the laser source.

The isolator 40 has a generally rectangular housing 42 with parallel upper 43 and lower 44 faces. In the center of the housing 42 there is a vertical aperture which forms a rectangular cavity 45 for a Faraday rotator 46. The cavity 45 is enclosed by an identical upper plate 47 and a lower plate 48 which attach to the upper 43 and lower 44 faces of the housing 42. Bolts 49 extend through apertures at the corners of the plates 47,48 and housing and engage hex nuts 50 at the bottom of the housing 42.

In the centers of the plates 47,48 are threaded apertures 51 which threadably engage bushings 52,53. The lower bushing 52 engages a slender post 54 of the support stand 41. The lower bushing 52 is removable for attaching alternate mounting systems (not shown). The threaded aperture 51 in the upper plate 47 threadably engages a bushing 53 which is part of an adjustment for tuning the Faraday rotator 46. An adjustment screw 55 with a jam nut 56 engages the upper bushing 53.

On the front portion of the housing a stepped bore 57, centered on the optical axis "C" of the isolator 40, extends into the cavity 45 to provide a beam path to the Faraday rotator 46. An input polarizer 59 is mounted in the bore 57 adjacent to a shoulder 60. The input polarizer 59 is comprised of a mounting ring 61 and an absorption type polarizing plate 62, by way of example Corning "POLARCOR", fixedly mounted in the ring 61. An aperture in the center of the ring forms the input aperture 63 of the isolator 40. Around the periphery of the ring 61 there is a V-groove 64 which engages the pointed end of a set screw 65. The set screw 65 threadably engages the housing 42 and locates the input polarizer 59 longitudinally and radially on the optical axis "C". The input polarizer 59 is radially adjusted to position the polarizer's principal axis vertical by rotating the polarizer 59 and tightening the set screw 65. A pair of small apertures 66 in outer face 67 of the ring 61 assist in rotating the polarizer 59.

On the rear of the housing 42 there is a second stepped bore 68 on the optical axis "C" for mounting an output polarizer 69. The stepped bore 68 extends forwardly into the cavity 45 of the housing 42. The output polarizer 69 is identical to the input polarizer 59 and the aperture 63 in the center of the ring 61 forms the output aperture 71 of the isolator 40. The output polarizer 69 is radially adjusted by rotating the polarizer 69 to align its principal axis with the 45 degree plane of polarization of the light beam "A" received from the Faraday rotator 46 and tightening the set screw 65.

The Faraday rotator 46 is comprised of a block optical transparent material 74 ("Faraday optic") with a high Verdet constant Ion the optical axis "C"; a first pair 75 of flat permanent magnets above the optical axis "C"; a second pair 76 of flat permanent magnets below the optical axis "C"; and a pair 77 of internal soft iron pole pieces on the optical axis "C", one ahead of the Faraday optic 74 and the other behind the Faraday optic 74; and a pair 78 of soft iron external pole pieces, one above the upper pair 75 of magnets and the other below lower pair 76 of magnets. Single magnets with pairs of magnetized regions can be used in place of pairs of magnets.

The external pole pieces 78 are fixed to the upper 75 and lower 76 pairs of magnets. Apertures 79 on the optical axis "C" extend through the internal pole pieces 77 to allow a beam to pass through the Faraday optic 74.

Figure 3:
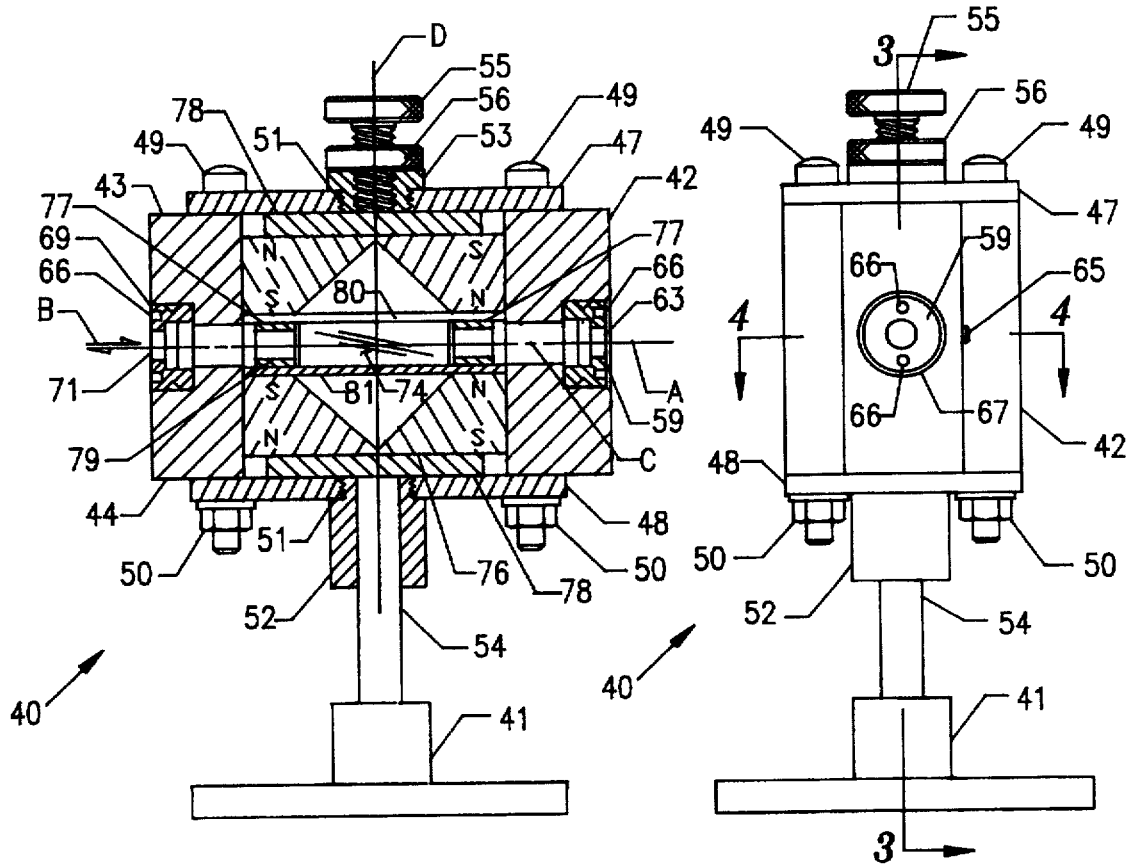
FIG. 3 is a cross-sectional view of the Faraday isolator taken on the line 3—3 in FIG. 2.
Figure 2:
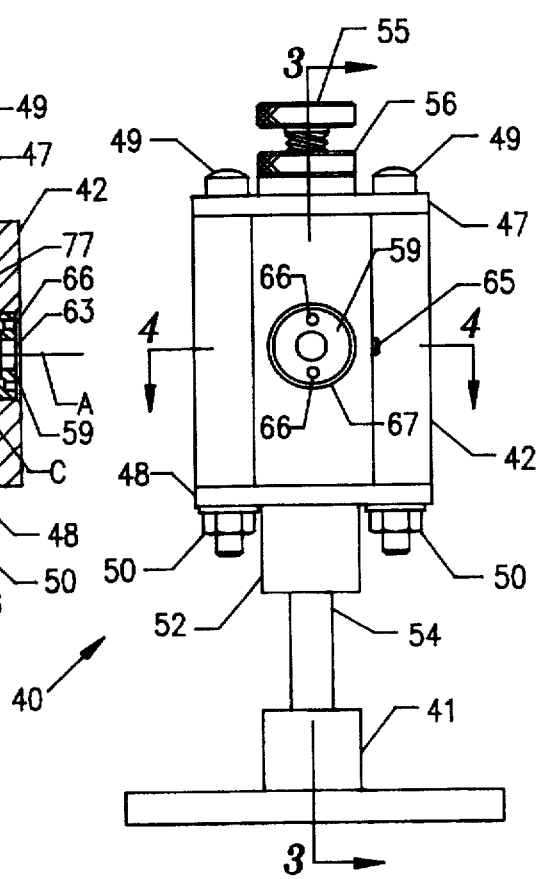
FIG. 2 is a front view of the Faraday isolator.

Referring now to FIG. 3, opposite poles of the upper magnets 75 and opposite poles of the lower 76 magnets are serially disposed while like poles of the magnets 75,76 face each other across the optical axis "C". The direction of magnetization of the magnets 75,76 is normal to the optical axis "C". The opposing polarities of the upper 75 and lower 76 magnets cause the upper 75 magnets to separate from the Faraday optic, forming a gap 80. The gap height 80 is selectively adjustable by rotating the adjusting screw 55. The rotation of the plane of polarization of the laser beam "A" is increased when the gap height 80 is decreased. A spacer plate 81 is provided between the lower 76 magnets and Faraday optic 74, the lower 76 magnets and internal pole pieces 77 being fixed to the spacer plate 81.

The magnets of each pair 75,76 abut each other in the lengthwise vertical mid-plane "D" of the Faraday optic 74 and diverge from the mid-plane "D" toward the Faraday optic 74, preferably to at least the ends of the Faraday optic 74. The geometry of the magnets 75,76 and pole pieces 77,78 generates an intense magnetic field with predominant components which are parallel to the path of the beam "A" passing through the Faraday rotator 46.

The invention is used as follows. The beam "A" from the light source enters the input aperture 63 and is linearly polarized. Thereafter the beam enters the Faraday rotator 46 where, under the influence of the uniform magnetic field, the plane of polarization of the beam "A" is rotated 45 degrees. After the plane of polarization is rotated, the beam "A" exits the isolator 40 through output aperture 71 of the output polarizer 69.

The amount of rotation of the beam in the Faraday rotator is a function of the Verdet constant, the magnetic field, and the path:

$$\Phi = V \int H_z dz \quad \text{(eqn. 1)}$$

where:

$\Phi$ = polarization rotation angle
V = Verdet constant
$H_z$ = longitudinal component of magnetic intensity vector
z = beam path Light "B" which is directed back toward the source enters the output polarizer 69 where it is plane polarized. The light "B" enters the Faraday rotator 46 where its plane of polarizer is rotated an additional 45 degrees and the light "B" is blocked in the input polarizer 59. Thus, isolation is achieved.

Permanent Magnet Geometries

The improved magnet geometry was evaluated by comparing the magnetic fields of U.S. Pat. No. 4,909,612 with alternate embodiments of the present invention. A finite difference 2-D computer program was used for the study. The computer model assumed that the magnets extended infinitely along the vertical mid-plane "D". The the magnets were assumed to be made of Shin-Etsu material No. N42. The characteristics of this material are:

$B_o = 6.6$ KGauss $H_c = -6.3$ KOersteds $P_c = 1.05$

Cross-sections taken perpendicular to the vertical mid-plane "D" for each case are shown in schematic form in FIGS. 20 through 25, inclusive. The directions of magnetization of the magnets are indicated by the vector $\beta$. The magnetic fields which correspond to the geometries of FIGS. 20 through 25 are shown in FIGS. 26 through 30.

For all cases, magnet thickness is 8 mm and spacing between magnets across the optical axis is 6 mm. For Cases I through IV, the magnet cross-sectional area is 1 sq cm. For Case V magnet cross-sectional area is reduced to 0.84 sq cm.

The uniformity of the magnetic fields was improved for each of the alternate embodiments.

The following results were obtained from the study.

Case I—Prior Art U.S. Pat. No. 4,909,612 FIGS. 20 and 26

Case I magnets on each side of the optical axis are in abutting relationship in the lengthwise vertical mid-plane of the Faraday optic. The direction of magnetization is perpendicular to beam path (see FIG. 20). The magnetic flux curves away from the center of gap and is non-uniform across the gap (see FIG. 26). The longitudinal magnetic field strength varies at the mid-plane of the Faraday optic from 10 KGauss on the optical axis to 15 KGauss 2.5 mm above and below the optical axis. At 6 mm away from the mid-plane, the field is reduced and varies from 3.1 KGauss on the optical axis to 2.9 KGauss 2.5 mm above and below the optical axis.

Figure 21:
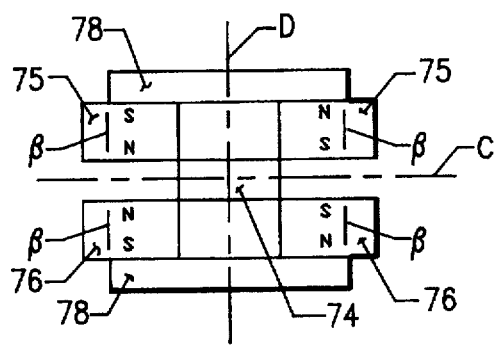
FIG. 21 is a schematic view of the magnets of prior art U.S. Pat. No. 4,909,612 moved apart 1.6 cm.
Figure 27:
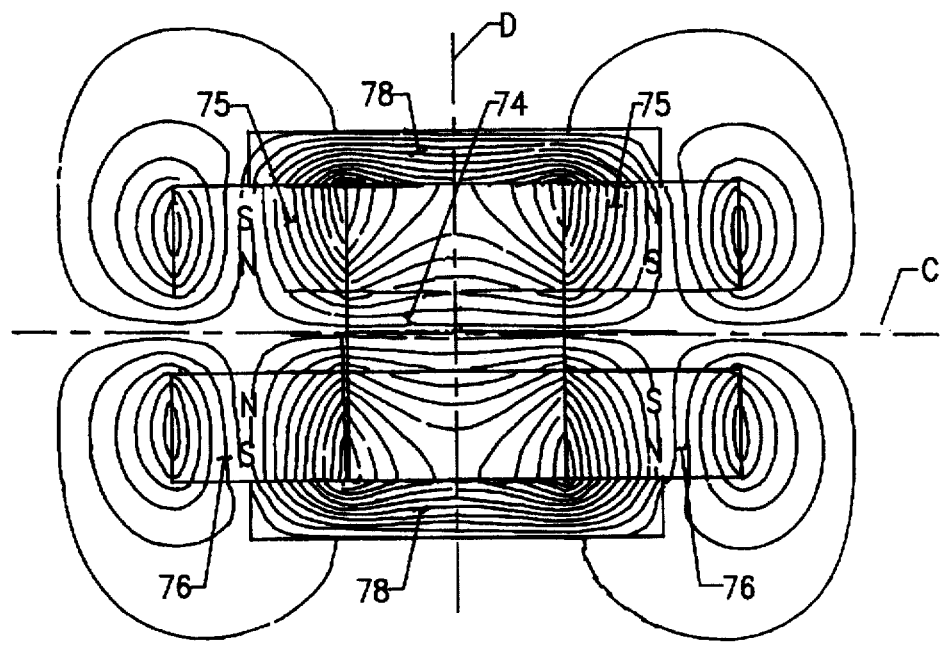
FIG. 27 shows the magnetic fields of FIG. 21.

Case II—Prior Art Magnets Spaced Apart 1.6 cm FIGS. 21 and 27

Case II magnets are the same as Case I (prior art) except spaced 1.6 mm apart (see FIG. 21). Uniformity of the fields is substantially improved over the prior art (see FIG. 27), but field strength is reduced. At the mid-plane the field strength varies from 4.1 KGauss on the optical axis to 3.8 KGauss 2.5 mm above and below the optical axis. At 6 mm away from the mid-plane, the field strength varies from 5.6 KGauss on the optical axis to 5.7 KGauss 2.5 mm above and below the optical axis.

Figure 22:
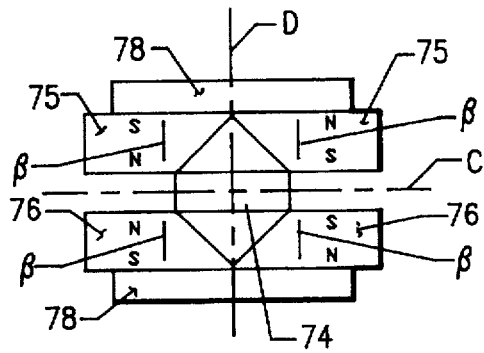
FIG. 22 is a schematic view of two pairs of magnets with angled faces between the magnets and magnetization vectors normal to the optical axis of an isolator.
Figure 28:
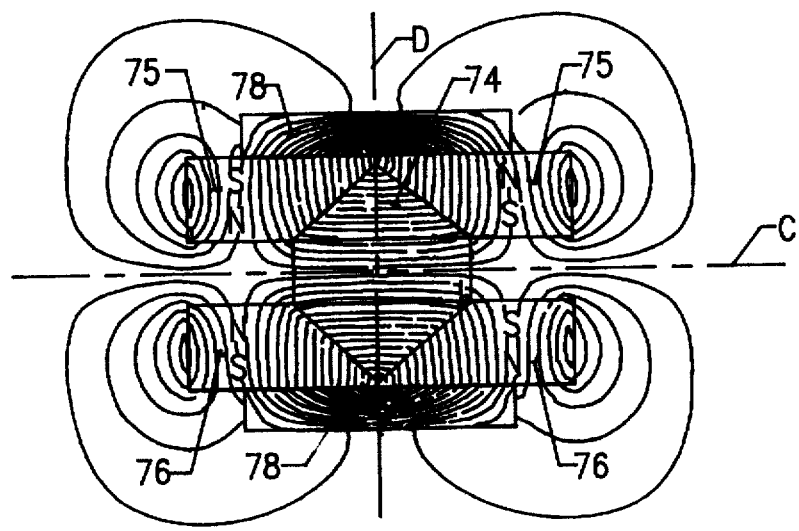
FIG. 28 shows the magnetic fields of FIG. 22.

Case III—Angled Faces Between Adjacent Magnets FIGS. 22 and 28

Case III magnets of each set have angled abutting faces and magnetization is normal to the optical axis (see FIG. 22). Uniformity and field strength are improved over Case II. At the mid-plane the field strength varies from 6.6 KGauss on the optical axis to 6.7 KGauss 2.5 mm above and below the optical axis. At 6 mm away from the mid-plane, the field strength varies from 5.9 KGauss on the optical axis to 6.5 KGauss 2.5 mm above and below the optical axis (see FIG. 28).

Figure 23:
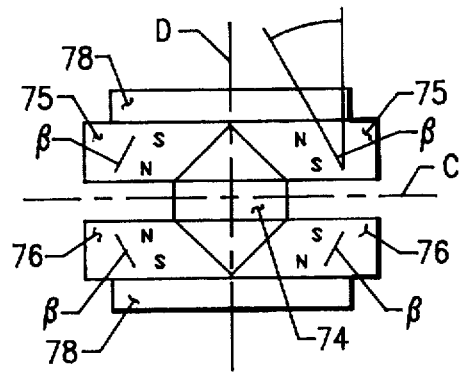
FIG. 23 is a schematic view of two pairs of magnets with angled faces between the magnets and magnetization vectors angled to the optical axis of an isolator.
Figure 29:
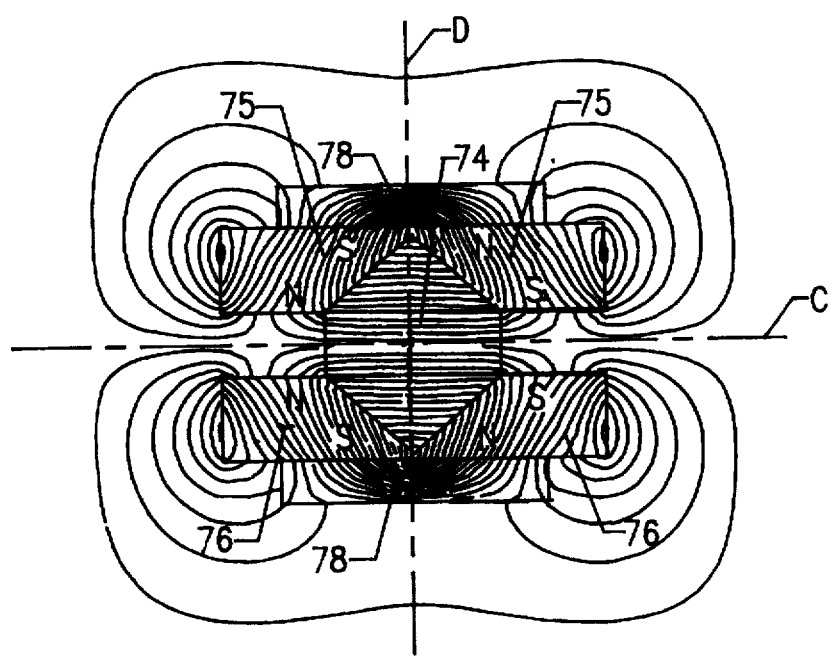
FIG. 29 shows the magnetic fields of FIG. 23.

Case IV—Angled Faces Between Adjacent Magnets and Angled Magnetization—FIGS. 23 and 29

Case IV is the same as Case III except magnetization is angled 15 degrees (see FIG. 23). Results show that the uniformity of the field can be improved over previous cases (see FIG. 29), however the strength of the magnetic field is reduced over Case III. At the mid-plane the field strength varies from 6.1 KGauss on the optical axis to 6.0 KGauss 2.5 mm above and below the optical axis. At 6 mm away from the mid-plane, the field strength varies from 6.0 KGauss on the optical axis to 6.5 KGauss 2.5 mm above and below the optical axis (see FIG. 29).

Figure 24:
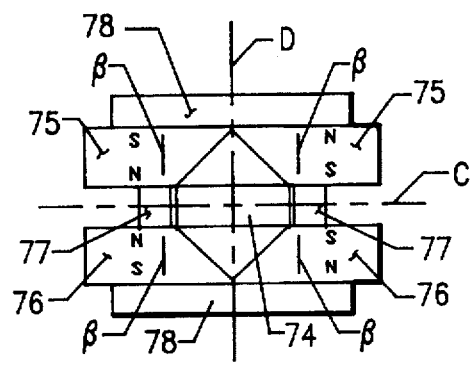
FIG. 24 is a schematic view of two pairs of magnets with angled faces between the magnets, magnetization vectors normal to the optical axis and internal pole pieces ahead of and behind the Faraday optic.
Figure 30:
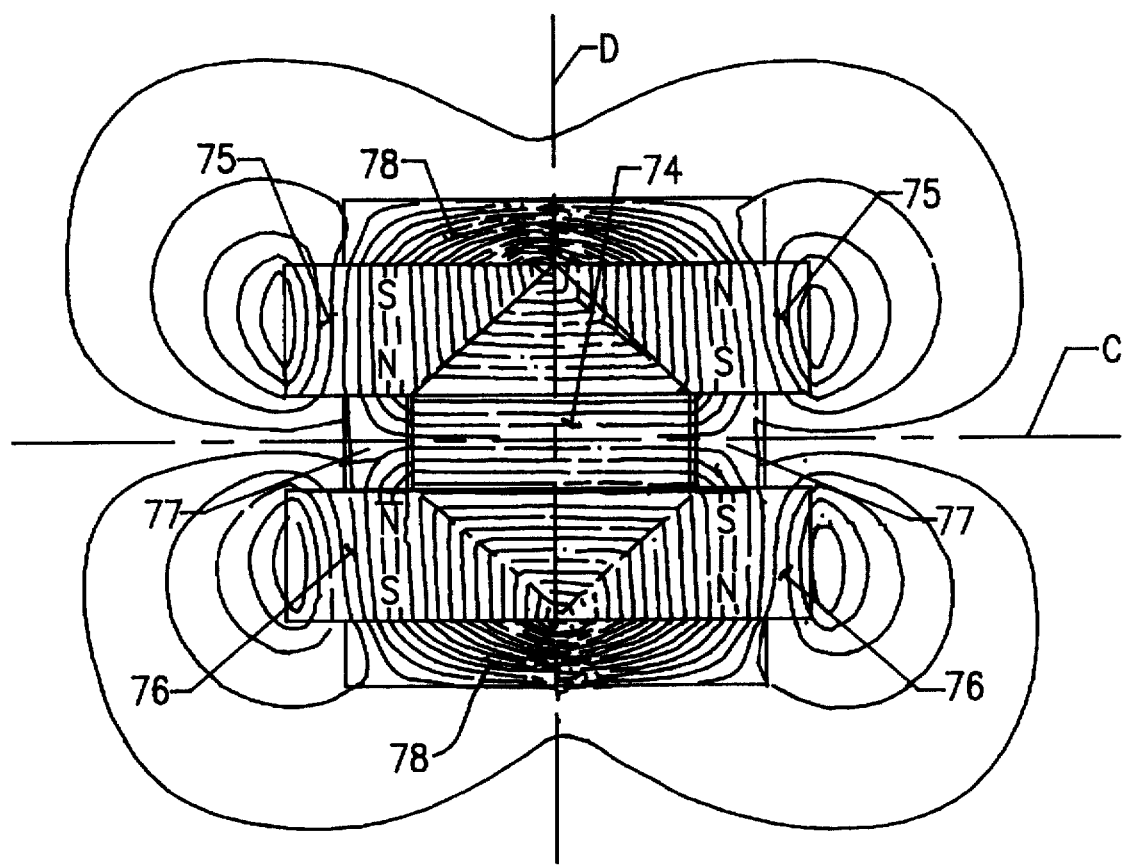
FIG. 30 shows the magnetic fields of FIG. 24.

Case V—Same as Case III Except Internal Pole Pieces Added and Magnet Cross-Section Areas Reduced to 0.84 sq cm FIGS. 24 and 30

This combination provides the best results (see FIG. 30). Case V is the same as Case III except soft iron pole pieces are added between the magnets ahead of and behind the Faraday optic (see FIG. 24). The internal pole pieces have a cross-section of 3.5 mm×6 mm. At the mid-plane the field strength is 6.6 KGauss on the optical axis and 6.6 KGauss at 2.5 mm above and below the optical axis. At 6 mm away from the mid-plane, the field strength is 6.5 KGauss on axis and 6.5 KGauss at 2.5 mm above and below the optical axis (see FIG. 29). Field uniformity is better than 99.5% across the gap.

Figure 31:
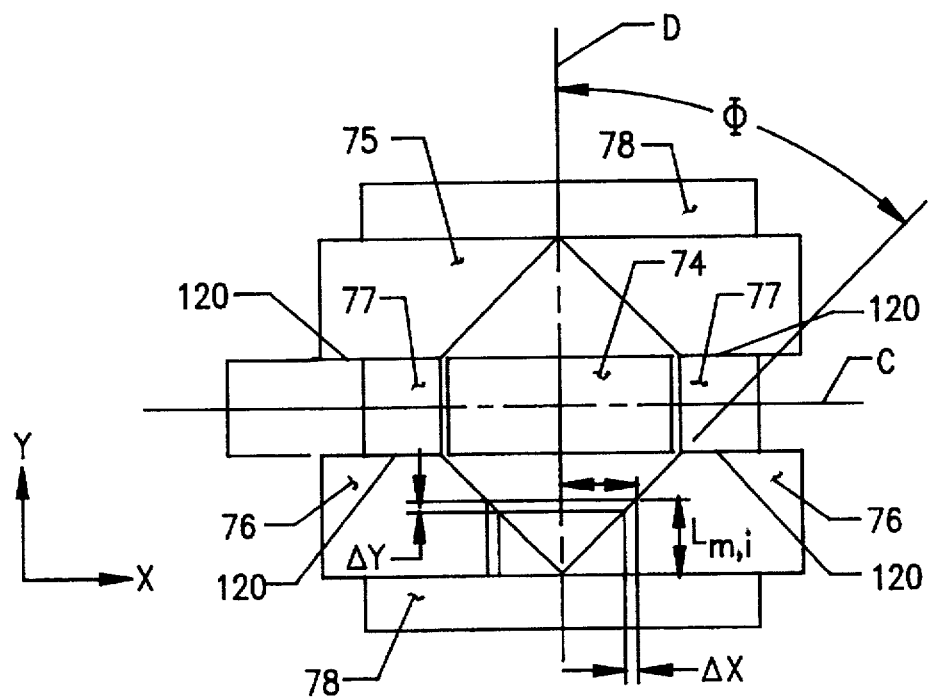
FIG. 31 is a diagram used in a computer model.

The optimum angle of the abutting magnet faces between adjacent magnets can be approximated as follows (See FIG. 31). For optimum efficiency the magnet and gap dimensions are designed such that the magnets operate at their maximum energy product. The permeance coefficient at the maximum energy product $P_{c,max}$ is a specified magnet material characteristic. We use the relation:

$$P_{c,max} = B_o/H_o = L_m A_g F/(L_g A_m r) \quad \text{(eqn. 2)}$$

where:

$B_o$ is the flux density at maximum energy operating point $H_o$ is the magnetizing force at the maximum energy operating point F is the leakage factor r is the reluctance factor $A_g$ is the area of the gap $A_m$ is the area of the magnet $L_m$ is the length of the magnet $L_g$ is the length of the gap To use eqn. 2 to approximate the optimum angle of the abutting magnet faces between adjacent magnets thin volumes of magnet material $V_{m,i}$ of length $L_{m,i}$ and cross sectional area $A_{m,i}$ and corresponding thin volumes of magnet gap $V_{g,i}$ of length $L_{g,i}$ and cross sectional area $A_{g,i}$ are defined as shown in FIG. 31. In the region of the Faraday optic 74 the leakage factor can be approximated to be F=1.

For any given magnet width dimension in the direction of the vertical mid-plane "D" we can write:

$$\tan \Phi = \Delta x/\Delta y$$

$$\tan \Phi = \Delta_{m,i}/\Delta_{g,i}$$

Similarly:

$$\tan \Phi = L_g/L_{m,i}$$

Eqn. 2 can now be written as:

$$P_{c,max} = 1/(r \tan^2 \Phi)$$

and $$\Phi = \arctan \sqrt{1/rP_{c,max}} \quad \text{(eqn. 3)}$$

where $\Phi$ is the angle between the angular magnet face and the mid-plane "D". The mid-plane "D" is parallel to the "y" axis.

Neodymium Iron Boron (Nd-Fe-B) magnets are presently readily available with maximum energy products in excess of 42 MGOe. The permeance coefficient of such material at the maximum energy product operating points is typically $P_{c,max}=1$ to 1.1. A reasonable estimate for the reluctance factor is r=1.05. Consequently, will typically be approximately 45° for such materials. For other materials with different values of $P_{c,max}$ eqn. 3 should be used to determine $\Phi$.

Due to external leakage considerations the length of the flat portions 120 of each pole face parallel to the optic axis "C" will approximately equal the gap thickness 121. The internal poles 77 typically have a width equal to one half the gap thickness 121. In an actual device similar considerations of external leakage indicate that the internal poles 77 should extend one half the gap thickness beyond each side of the Faraday optic 74 in the direction of the mid-plane "D". Further external leakage considerations indicate that the magnets should extend a full gap thickness 121 beyond each side of the Faraday optic 74 in the direction of the mid-plane "D".

Figure 25:
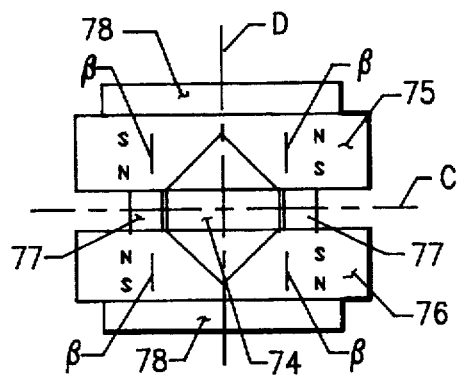
FIG. 25 is a schematic view showing a single magnet with two magnetization regions in place of two pairs of magnets of FIG. 24.
Figure 26:
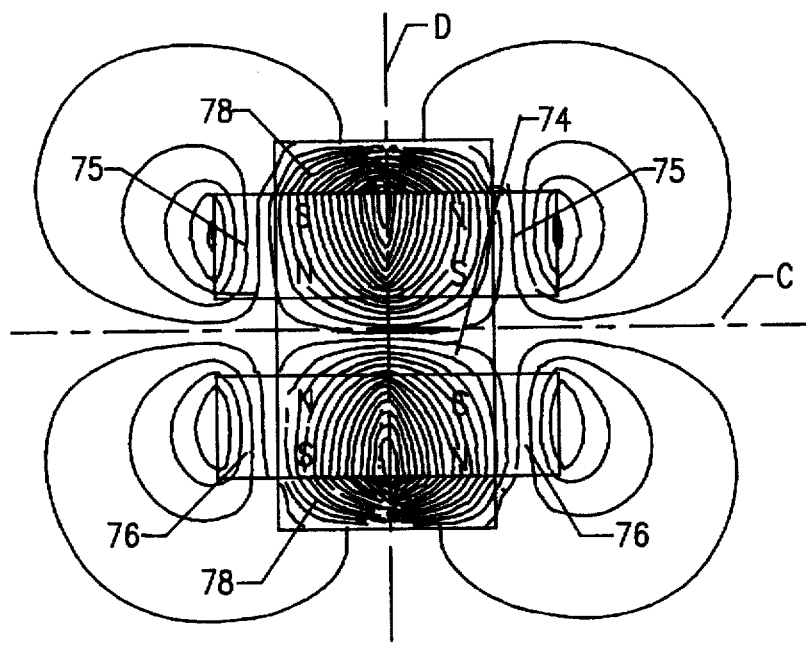
FIG. 26 shows the magnetic fields of the prior art U.S. Pat. No. 4,909,612.

Case VI—Same as Case V Except Single Magnets on Each Side of Optical Axis FIGS. 25 and 30

Case VI is the same as Case V except a single magnet having a pair of magnetized regions replaces each pair of magnets (see FIG. 25). The magnetic fields are the same (see FIG. 30).

In the second aspect of the invention shown in FIGS. 5 through 10, inclusive, the Faraday isolator 83 has been reduced in size by reflecting the beam "A" back and forth in a zig-zag path in a Faraday optic 85. The cavity 86 of the housing 87 is inclined with respect to the input polarizer 59. The light beam is plane polarized in the input polarizer 59 and enters the Faraday optic 85 through an optically transparent portion 88 on the front face 89 of the Faraday optic 85. The beam "A" is refracted on entering the Faraday optic 85 and is reflected back and forth by reflective coatings 90,93 on the front 89 and rear 91 faces of the Faraday optic 85 in a zig-zag path. A predominant component of the uniform magnetic field is parallel to the zig-zag path of the beam "A" in the Faraday optic 85. The beam 84 exits the Faraday optic 85 at an optically transparent portion 92 of the rear face 91 of the Faraday optic 85 and is refracted. Thereafter, the beam passes through the quarter wave plate 70 to cancel the elliptic polarization effects of the Faraday rotator 46 and exits the isolator 83 through the output polarizer 69.

The construction of the quarter wave plate 70 is similar to the output polarizer 69, there being a ring 72 and an optical element 73 mounted in the ring 72. The quarter wave plate 70 introduces a relative phase shift of $\Phi=\pi/2$ between the constituent orthogonal 0- and e-components of the wave to cancel elliptical polarization due to coatings and the slight birefringence in the Faraday optic 85.

Figure 11:
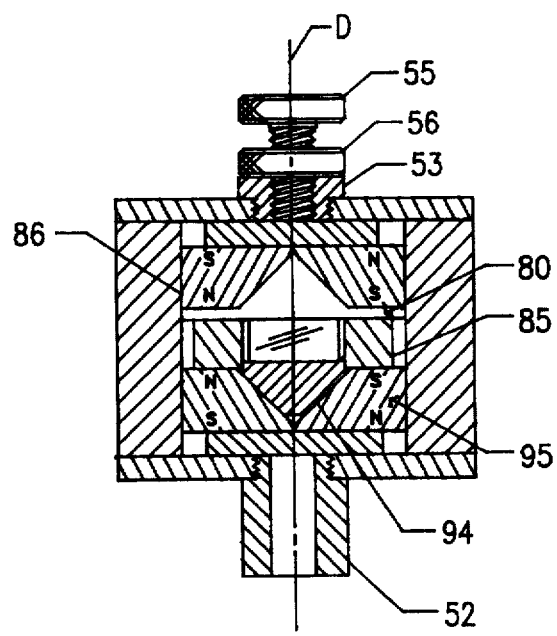
FIG. 11 is a cross-sectional view taken in the same manner as FIG. 9 of an alternate embodiment having a heat sink.
Figure 9:
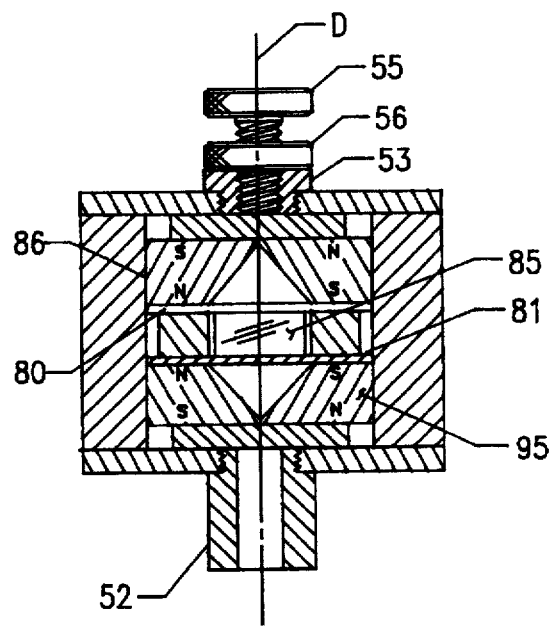
FIG. 9 is a cross-sectional view taken on the line 9—9 in FIG. 8.
Figure 10:
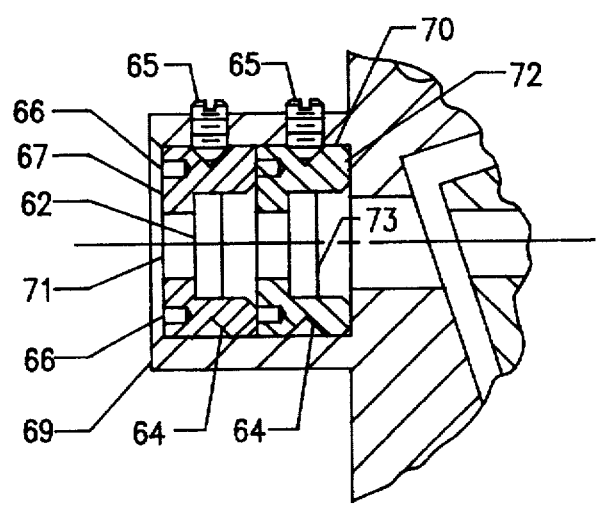
FIG. 10 is an enlarged partial view of FIG. 8 showing the output polarizer and quarter wave plate of the isolator in enlarged detail.
Figure 15:
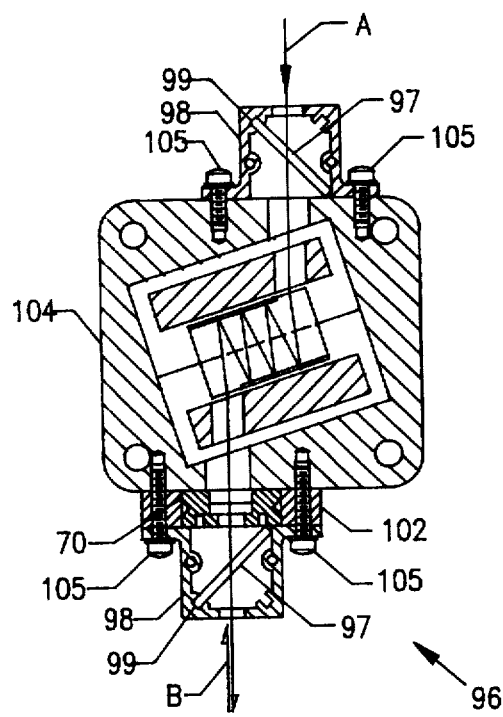
FIG. 15 is a cross-sectional view taken on the line 15—15 in FIG. 13.
Figure 12:
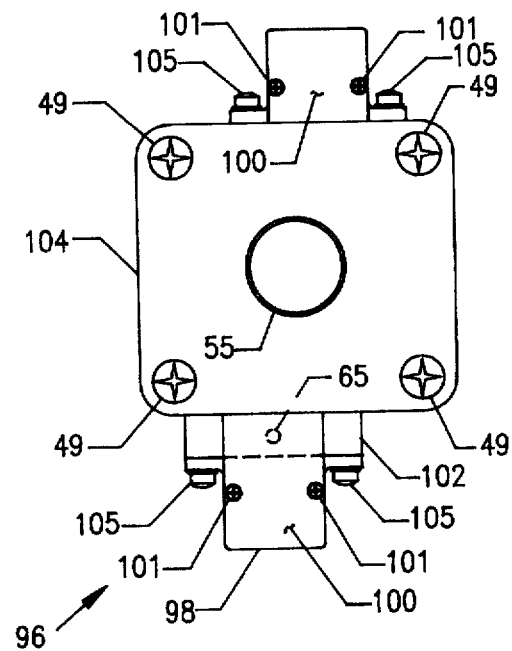
FIG. 12 is a plan view of an alternate embodiment having Brewster type input and output polarizers.
Figure 14:
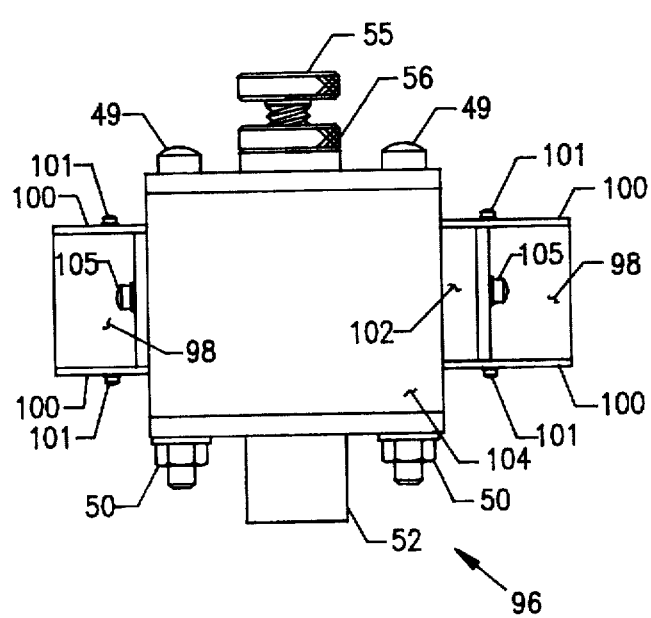
FIG. 14 is a left side view of the embodiment of FIG. 12.
Figure 13:
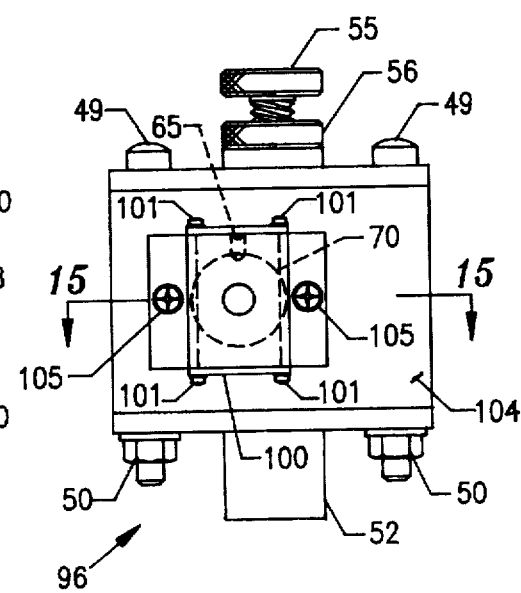
FIG. 13 is a rear view of the embodiment of FIG. 12.
Figure 19:
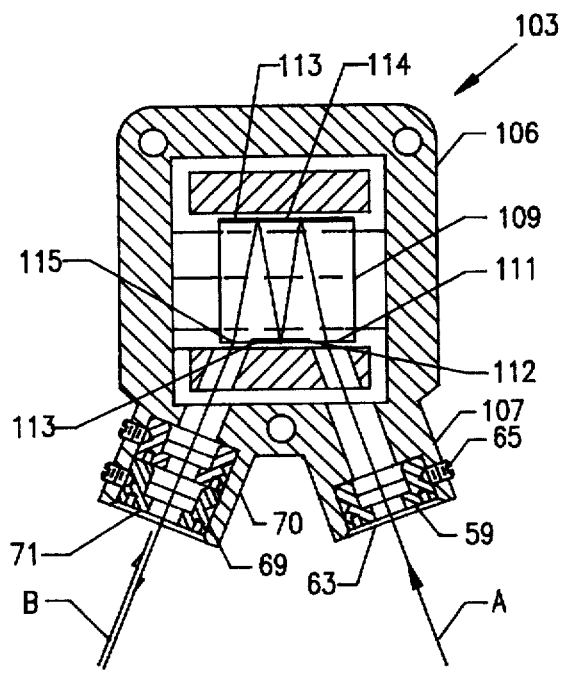
FIG. 19 is a cross-sectional view taken on the line 19—19 of FIG. 17.
Figure 16:
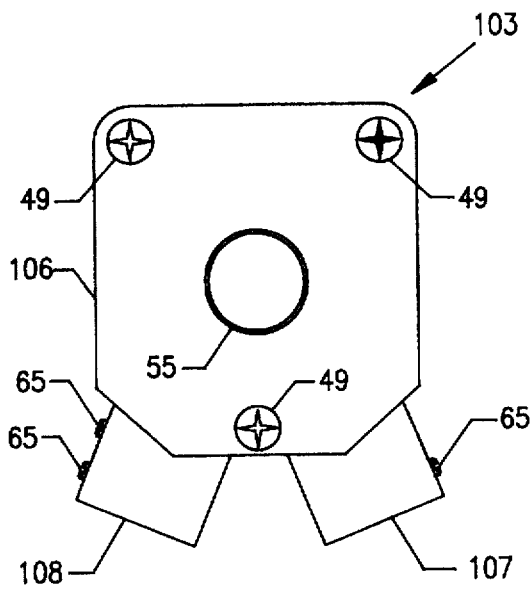
FIG. 16 is a plan view of an alternate embodiment with input and output apertures on the front of the isolator.
Figure 18:
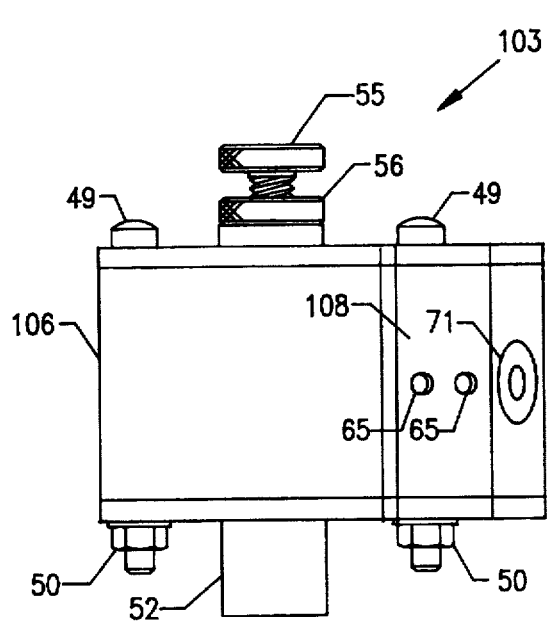
FIG. 18 is a right side view of the embodiment of FIG. 16.
Figure 17:
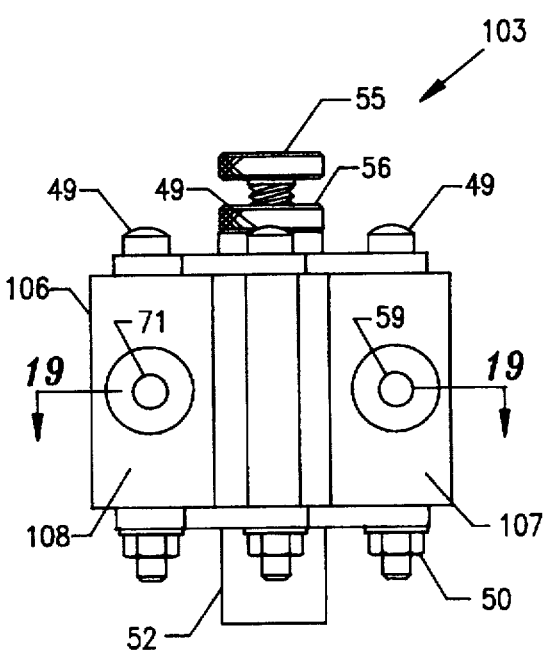
FIG. 17 is a front view of the embodiment of FIG. 16.
Figure 20:
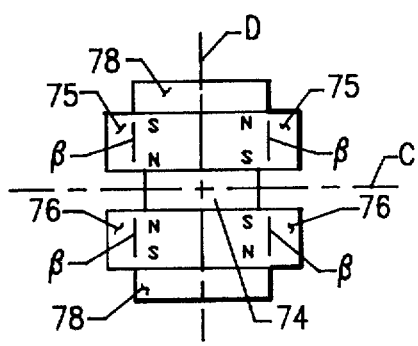
FIG. 20 is a schematic view of the magnets of prior art U.S. Pat. No. 4,909,612, including the magnetization vectors.

In FIG. 11, a triangular aluminum block 94 fills the triangular space bounded by the lower magnets 95 and Faraday optic 85 to provide a heat sink for dissipating heat in the Faraday optic 85. Alternatively, aluminum block 94 could be replaced with a thermally non-conductive part such as glass with a hybridized thick film resistive heater for temperature control of the Faraday optic to maintain high isolation in varying ambient temperatures.

With reference to FIGS. 12 through 15, an embodiment 96 is shown having a pair of Brewster polarizers 97 and a quarter wave plate 70. The polarizers 97 are enclosed in hat shaped housings 98 having channels 99 for locating Brewster polarizers 97. The polarizer housings 98 are attached to the isolator housing 104 with screws 105. The upper and lower ends of the polarizer housings 98 are covered with thin aluminum covers 100 attached with screws 101. The thin covers are removable for servicing the polarizers 97 and quarter wave plate 70. The quarter wave plate 70 is held in a bracket 102 and is positioned with a set screw 65 which engages the V-groove 64.

In FIGS. 16 through 19, an embodiment 103 is disclosed having input 59 and output 69 polarizers on the front of the isolator 103. The isolator 103 is comprised of a housing 106 having a pair of input 107 and output 108 bosses on the front of said housing 106 and a Faraday optic 109 which is similar to the Faraday optic 85 of FIGS. 5 through 10. A light beam "A" is plane polarized in the input polarizer 59 and enters the Faraday optic 109 through an optically transparent portion 111 on the front face 112 of the Faraday optic 109. The beam "A" is refracted at the transparent portion 111, is reflected back and forth by reflective coatings 113 on the front 112 and rear 114 faces of the Faraday optic 109 in a zig-zag path, is refracted and exits through a transparent portion 115 on the front face 112 of the Faraday optic 109, passes through the quarter wave plate 70 and exits the isolator 103 through the output polarizer 69 at the front of the isolator 103.

The improved performance of the isolator was demonstrated during a laboratory test of a prototype isolator. Two calcite polarizers with measured extinction of better than $1 \times 10^6 : 1$ (60 dB) were used in the test for evaluating the effectiveness of the present invention. The first calcite polarizer was used to linearly polarize to a high degree a 2 mm diameter beam of a 150 mW cw Nd:YAG laser operating at 1064 nm. The second polarizer was mounted on a rotation stage in order to analyze the Faraday rotation angle with a resolution of 6 minutes.

The Faraday optic was made of Hoya FR-5 terbium doped glass. Thin film coatings were deposited over the entire surface of the ends of the optic in the path of the laser beam. A portion of the coated ends was coated to be transparent anti-reflective at 1064 nm. The anti-reflective regions were located at opposite sides of the ends.

The magnet material was Crucible Magnetics CRUMAX 355. At the operating point for maximum energy product the nominal characteristics (±10% tolerance) for this material are:

$B_o=6.1$ KGauss
$H_o=5.7$ KOersteds
$P_c=1.07$

The 1064 nm laser beam passing through the first polarizer was incident into the anti-reflection coated region of one end of the Faraday optic at an external angle of 10 degrees. Aligned in this manner, the laser beam made 7 passes in a zig-zag fashion through the Faraday optic before exiting out the anti-reflective coated region of the other end of the optic. The laser beam was then directed through the second polarizer (analyzer) and into a Newport Corporation Model 820 laser power meter.

Figure 32:
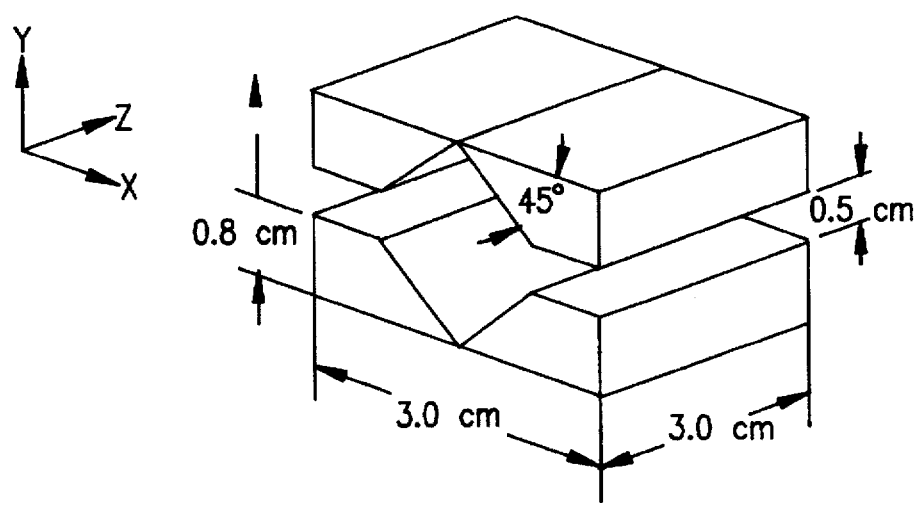
FIG. 32 is a view of magnets used in a laboratory experiment.

The new magnet geometry, shown in FIG. 32, attached to x, y and z translation stages, was then positioned such that the Faraday optic was located in the physical center of the gap. When the magnet gap thickness was adjusted for 5.0 mm, the Faraday rotation angle was measured with the analyzing polarizer to be precisely 45 degrees at 22 degrees centigrade. The polarization out of the Faraday rotator was 5 percent elliptical due to the coatings and slight birefringence of the Faraday optic. A quarter wave plate was then inserted between the first polarizer and the Faraday isolator and adjusted to cancel the 5 percent polarization ellipticity out of the Faraday rotator. With the quarter wave plate installed, the isolation ratio of the entire assembly was measured to be 100,000 to 1 (50 dB).

Measurements taken during this test indicate that a Faraday optic aligned for 5 zig-zag passes through a Faraday optic measuring 1.5 cm long×2 cm wide×0.5 cm thick with 5.5 mm wide anti-reflection coated regions would be sufficiently large to construct a 5 mm clear aperture 30 dB Faraday isolator with the magnet used in the tests.

From the foregoing it will be appreciated that my invention provides a compact Faraday isolator with uniform internal magnetic fields with benefits heretofore unavailable.

Although but several embodiments have been illustrated and described, it is not my intention to limit my invention to these embodiments, since other embodiments can be derived by changes in material, construction and shape without departing from the spirit thereof.

I claim:

1. An optical apparatus comprising: a Faraday rotator for rotating the plane of polarization of a beam of polarized light around an optical axis passing through said Faraday rotator, said Faraday rotator comprising a block of optically transparent rotator material having a high Verdet constant, said rotator material being longitudinally disposed on said optical axis; a first pair of serially disposed permanent magnets on one side of said optical axis and a second pair of serially disposed permanent magnets on an opposite side of said optical axis, said first and said second pair of magnets being adjacent upper and lower faces of said rotator material and having pole faces on opposite sides of said optical axis, about equidistant from said optical axis, each of said pole faces of said magnets of said first and said second pairs of magnets being adjacent to said rotator material, said magnets of said first and said second pairs of magnets being generally aligned with the path of said beam and spaced apart from each other in said pairs in the direction of the path of said beam, said spacing apart of said magnets in said pairs forming gaps in said pairs between said magnets along said optical axis for producing an intense and uniform magnetic field within said rotator material having a predominant component generally parallel to the path of said beam through said Faraday rotator, each of said magnets in said first and said second pair of said magnets having a magnetization direction which is generally normal to the path of said beam, said magnets of said first pair of said magnets and said magnets of said second pair of said magnets having unlike poles facing each other in the direction of the path of said beam and said second pair of permanent magnets having like poles facing like poles of said first pair of said magnets across said optical axis.

2. The optical apparatus recited in claim 1 wherein said block of optically transparent rotator material is a rectangular shaped block.

3. The optical apparatus recited in claim 1 wherein said each of first and said second pairs of serially disposed magnets are polyhedral shaped magnets.

4. The optical apparatus recited in claim 1 further comprising each of said magnets of said pairs of said magnets having inclined faces which abut each other at outer portions of said magnets and diverge away from each other toward said optical axis.

5. The optical apparatus recited in claim 4 wherein the angle of said inclined faces and said optical axis is about 45 degrees.

6. The optical apparatus recited in claim 1 further comprising an input polarizer for polarizing a beam entering said apparatus, said input polarizer disposed on said optical axis ahead of said Faraday rotator.

7. The optical apparatus recited in claim 1 further comprising an output polarizer for polarizing light directed back toward a source, said output polarizer disposed on said optical axis behind said Faraday rotator.

8. The optical apparatus recited in claim 1 further comprising a means for selectively moving at least one of said pairs of permanent magnets toward and away from said block of rotator material to vary the amount of rotation of the polarized beam passing through said Faraday rotator.

9. The optical apparatus recited in claim 1 further comprising said block of rotator material having an optically transparent input face portion, an optically transparent output face portion and reflective spaced apart face portions between which said beam is reflected back and forth in a zig-zag path between said input and said output face portions.

10. The optical apparatus recited in claim 1 further comprising a quarter wave plate disposed on said optical axis.

11. The optical apparatus recited in claim 1 further comprising a pair of pole pieces on said optical axis between said magnets, one of said pole pieces ahead of said block of rotator material and the other of said pole pieces behind said block of rotator material.

12. The optical apparatus recited in claim 1 further comprising a first pole piece adjacent to said first pair of magnets and a second pole piece adjacent to said second pair of magnets.

13. The optical apparatus recited in claim 1 further comprising a housing for enclosing said Faraday rotator, said housing having an aperture on the front of said housing for admitting light beams into said housing and an aperture on the rear of said housing for allowing said beams to leave said housing.

14. The optical apparatus recited in claim 1 further comprising a housing for enclosing said Faraday rotator, said housing having a first aperture in the front of said housing for admitting beams into said housing and a second aperture in said front of said housing for allowing said beams to leave said housing.

15. In an optical apparatus having an optical axis and an optically transparent high Verdet constant block of rotator material in a magnetic field, a first pair of serially disposed polyhedral shaped permanent magnets on one side of the optical axis adjacent an upper face of said rotator material and a second pair of serially disposed permanent polyhedral shaped magnets on the opposite side of said optical axis adjacent a lower face of said rotator material the improvement comprising: said magnets of each of said pairs of permanent magnets having faces which abut each other at outer portions of said magnets in a vertical mid-plane of said rotator material and diverge outwardly from said mid-plane toward said rotator material, said faces diverging to about the ends of the rotator material, said diverging of said abutting faces forming gaps between said magnets in said pairs in the direction of said optical axis for producing an intense and uniform magnetic field in said rotator material having predominant components generally parallel to the path of a light beam passing through said Faraday rotator.

16. The optical apparatus recited in claim 15 further comprising each of said magnets in said first and said second pairs of said magnets having a magnetization direction which is generally normal to the path of said beam, said magnets of said first pair of said magnets and said magnets of said second pair of said magnets having unlike poles facing each other in the direction of the path of said beam and said second pair of permanent magnets having like poles facing like poles of said first pair of said magnets across said optical axis.

17. The optical apparatus recited in claim 15 further comprising a pair of soft iron pole pieces on said optical axis between said first and said second pairs of permanent magnets, one of said pole pieces disposed ahead of said rotator material and the other of said pole pieces disposed behind said rotator material.

18. The optical apparatus recited in claim further comprising a means for moving one of said pairs of permanent magnets closer to and farther from said rotator material to adjust the amount of rotation of a plane of polarization of a light beam passing through said optical apparatus.

19. The optical apparatus recited in claim 15 further comprising a means on said optical axis for cancelling elliptic polarization effects of said rotator material on a light beam passing through said apparatus.

20. An optical apparatus comprising: a housing; an input polarizer, said input polarizer having an axis which is aligned with an optical axis of said apparatus; an output polarizer, said output polarizer having an axis which is aligned with said optical axis of said isolator; a Faraday rotator mounted in the interior of said housing, said Faraday rotator including a transparent rotator material disposed on said optical axis, having an upper face on one side of said optical axis and a lower face on an opposite side of said optical axis; and a means for generating an intense uniform magnetic field within said rotator material, said magnetic field having a predominant component substantially along the entire path of a light beam passing through said rotator material, said means for generating said field within said rotator material comprising a first pair of magnets adjacent to said upper face of said rotator material, and spaced apart in the direction of said optical axis, and a second pair of magnets on the opposite side of said axis, adjacent to said lower face of said rotator material and spaced apart in the direction of said optical axis.

21. The optical apparatus recited in claim 20 wherein said means for generating said uniform magnetic field within said rotator material comprises a first pair of serially disposed magnets on one side of said optical axis and a second pair of serially disposed magnets on an opposite side of said optical axis, each of said magnets of said first and said second pairs of magnets being spaced apart from each other in the general direction of the path of said beam, and having a magnetization direction which is generally normal to the path of said beam.

22. The optical apparatus recited in claim 21 wherein each of said magnets of said pairs of said magnets having inclined faces which abut each other to diverge outwardly away from each other toward said optical axis.

23. The optical apparatus recited in claim 22 wherein the angle between each of the abutting faces and a plane which is normal to said optical axis is:

$$\Phi = \arctan \sqrt{1/rP_{max}}$$

where:

r is the reluctance factor $P_{c,max}$ is the maximum energy product of the magnet material.

24. An optical apparatus comprising a Faraday rotator means for rotating the plane of polarization of a beam of polarized light around an optical axis passing through said Faraday rotator means, said Faraday rotator means comprising at least one permanent magnet means on one side of said optical axis having two magnetized regions, said magnetized regions being magnetically spaced apart in the direction of the path of the polarized beam for producing an intense and uniform magnetic field having a predominant component generally parallel to the path of said beam through said Faraday rotator means, each of said magnetized regions having a magnetization direction which is generally normal to the path of said beam, said magnetized regions of said permanent magnet means having unlike poles facing each other in the direction of the path of said beam, said magnetized regions at an outer portion of said magnet having magnetization directions which magnetically diverge outwardly away from each other toward said optical axis between first and second pairs of permanent magnets, and a pair of pole pieces, one of said pole pieces disposed ahead of said Faraday rotator mean and the other of said pole pieces disposed behind said Faraday rotator mean.

* * * * *

UNITED STATES PATENT AND TRADEMARK OFFICE
CERTIFICATE OF CORRECTION

PATENT NO. : 5,715,080
DATED : Feb. 3, 1998
INVENTOR(S) : David G. Scerbak

It is certified that error appears in the above-indentified patent and that said Letters Patent is hereby corrected as shown below:

Column 4, line 66, after constant, change "Ion" to --on--

Column 7, line 51, change "tan $\phi=A_m/A_{g,i}$" to --tan $\phi=A_{m,i}/A_{g,i}$--

Column 7, line 55, change "tan $\phi=L_g/L_{m,i}$" to --tan $\phi=L_{g,i}/L_{m,i}$--

Column 8, line 6, after "Consequently," insert -- $\phi$ --

Claim 18, line 1, after "claim" insert --15--

Claim 23, line 4, change "$\phi=\text{arctan } \sqrt{1/rP_{max}}$" to -- $\phi = \text{arctan } \sqrt{1/rP_{c,max}}$ --

Column 14, lines 7 and 8, change "mean" to --means--

Signed and Sealed this

Nineteenth Day of May, 1998

Attest:

BRUCE LEHMAN

Attesting Officer     Commissioner of Patents and Trademarks